(12) United States Patent
Cheng

(10) Patent No.: US 8,914,492 B2
(45) Date of Patent: Dec. 16, 2014

(54) METHOD AND APPARATUS FOR SELECTING USER POLICIES

(75) Inventor: King L K Cheng, Ipswich (GB)

(73) Assignee: British Telecommunication PLC, London (GB)

( * ) Notice: Subject to any disclaimer, the term of this patent is extended or adjusted under 35 U.S.C. 154(b) by 2247 days.

(21) Appl. No.: 10/513,595

(22) PCT Filed: May 6, 2003

(86) PCT No.: PCT/GB03/01913
§ 371 (c)(1),
(2), (4) Date: Nov. 5, 2004

(87) PCT Pub. No.: WO03/096242
PCT Pub. Date: Nov. 20, 2003

(65) Prior Publication Data
US 2005/0240670 A1 Oct. 27, 2005

(30) Foreign Application Priority Data
May 7, 2002 (EP) .................................. 02253168

(51) Int. Cl.
*G06F 15/173* (2006.01)
*G06F 15/16* (2006.01)
*G06Q 10/04* (2012.01)

(52) U.S. Cl.
CPC .................................... *G06Q 10/04* (2013.01)
USPC .......................................... 709/224; 709/228

(58) Field of Classification Search
USPC .......... 709/223, 224, 226, 227, 230; 707/7, 9, 707/100
See application file for complete search history.

(56) References Cited

U.S. PATENT DOCUMENTS

| | | | | | |
|---|---|---|---|---|---|
| 6,078,953 | A | * | 6/2000 | Vaid et al. | 709/223 |
| 6,078,958 | A | * | 6/2000 | Echeita et al. | 709/226 |
| 6,137,777 | A | * | 10/2000 | Vaid et al. | 370/230 |
| 6,167,445 | A | * | 12/2000 | Gai et al. | 709/223 |
| 6,301,613 | B1 | * | 10/2001 | Ahlstrom et al. | 709/223 |
| 6,427,132 | B1 | * | 7/2002 | Bowman-Amuah | 703/22 |
| 6,449,650 | B1 | * | 9/2002 | Westfall et al. | 709/228 |
| 2002/0181462 | A1 | * | 12/2002 | Surdila et al. | 370/392 |
| 2002/0194251 | A1 | * | 12/2002 | Richter et al. | 709/105 |
| 2003/0039212 | A1 | * | 2/2003 | Lloyd et al. | 370/235 |
| 2003/0046396 | A1 | * | 3/2003 | Richter et al. | 709/226 |
| 2003/0088671 | A1 | * | 5/2003 | Klinker et al. | 709/225 |

FOREIGN PATENT DOCUMENTS

| WO | WO 01/01729 A1 | 1/2001 |
|---|---|---|
| WO | WO 02/15462 A1 | 2/2002 |
| WO | WO 02/33428 A1 | 4/2002 |

* cited by examiner

*Primary Examiner* — Gerald Smarth
(74) *Attorney, Agent, or Firm* — Nixon & Vanderhye PC

(57) ABSTRACT

Application sessions are matched to user network usage or buying policies based upon a scoring system which reflects a user value to each policy for different applications. Several user policies are stored, each containing a list of matching criteria. Each criterion has a score for each element. The content of an application session description is used to compare with each user policy, and a policy score is awarded to each criterion if matched, or else, no score is awarded. The user policy which scores the highest policy score (which may be adjusted to be expressed as a percentage) is then chosen as the policy to use for the application session.

19 Claims, 5 Drawing Sheets

METHOD AND APPARATUS FOR SELECTING USER POLICIES

This application is the U.S. national phase of international application PCT/GB03/01913 filed 6 May 2003 which designated the U.S. and claims benefit of EP 02253168.5 dated 7 May 2002, the entire content of each of which is hereby incorporated by reference.

BACKGROUND

1. Technical Field

The present invention relates to: a method; a computer program; a computer program product; and an apparatus; all for selecting a user network usage policy, and in particular for selecting a user policy to use with a particular application session.

2. Related Art

The mapping of application sessions to user policies is a very important requirement for both present and future Internet technologies such as Quality of Service (QoS) provision, usage control and QoS control. At the present time, there is no direct way for users to control their Internet traffic behaviour, behaviour such as transmission rate and aggressiveness. Instead, users rely on TCP, UDP and other closed loop transport layer control protocols to control the traffic on their behalf.

Nowadays, users use the Internet for several different things at a time, for instance, downloading articles from a newsgroup and having a voice-chat with her friends in a chat room. In spite of both applications are using the same network connection, they have different network resource requirements such as bandwidth and delay. At the moment, using TCP, both applications will have to fight against each other to get the network resources they need.

In a dynamic pricing scenario (such as, for example, that being considered by the M3I Consortium (see www.m3i.org)) an agent can be set up to help the user to react to dynamic pricing signals. It requires the user to specify a control policy, usually represented as the user utility. As the user may have different preferences to each application task, so a different control policy is applied to them. Clearly, if the agent doesn't have a policy input, it will not be able to react to the dynamic price.

According to present research in advanced Internet technology, what is still missing in order to address the above problem is the bonding of Internet traffic flows, application sessions and user policies. Solutions which partially address this problem are starting to appear, and in particular our own earlier co-pending European Patent Application No 02251983.9 discloses a system to map data traffic flows with application sessions. This solves part of the problem in that it allows data flows generated by application sessions to be identified and mapped thereto, but what is still missing is the additional step of then mapping an application session to a user network usage policy, which contains information on, for example, how the user wishes to respond to different network prices, whether different types of data should be given a higher priority (and hence paid for at a higher charge for network transport thereof), how the system should respond to dynamic pricing signals received from the network, etc. etc. As will be apparent from the foregoing, the proper mapping of user usage policies to applications sessions is essential for dynamic internet charging scenarios.

The application session to user policy mapping problem has been considered before, but problems arise with previous solutions in that they are not particularly flexible. An example is where a user's preference is hardwired to the system. In this case the system has a pre-programmed user's preference set in the system, and hence the preference may not truly represent what the user wants at all times or for each different type of network application. An example of this is where a default user policy is provided to the user by the user's Internet Service Provider for use with all network applications.

In another known solution, the user has to select his/her utility before the start of a session (e.g. in most M3I scenarios). However, to keep asking a user what they want for every application session which is launched is not a practical solution, as it wastes time and furthermore tends to cater only for the needs of expert users who know the significance of the options available. For an average lay user of networks such as the Internet, the specific tuning required by this solution upon the launching of each and every network application session is not a viable option, and both expensive mistakes may be made by inexperienced users who select a high utility for data (indicating that they would be willing to pay a high price for its transport over the network) for which in reality the user has only a relatively low utility.

BRIEF SUMMARY

The present exemplary embodiment addresses the problems noted above by the provision of a method and system which provides the matching of application sessions to user network usage or buying policies based upon a scoring system which reflects a user value to each policy for different applications. Several user policies are stored, each containing a list of matching criteria. Each criterion has a score for each element. The content of an application session description is used to compare with each user policy, and a policy score is awarded to each criterion if matched, or else, no score is awarded. The user policy which scores the highest policy score (which may be adjusted to be expressed as a percentage) is then chosen as the policy to use for the application session.

In view of the above, according to a first aspect of the present invention there is provided a method of selecting a user network usage or buying policy for use with an application session, comprising the steps of:

a) storing a plurality of user network usage policies;

b) for each policy of at least a subset of the stored policies, comparing one or more characteristics of the application session with one or more policy characteristics to determine a policy score for each policy in the subset; and c) selecting a policy for use in dependence on the policy scores.

As the mapping of application sessions to user policies has always been a huge difficulty for service provider as much as for researcher the present invention provides the advantage that it significantly helps service providers to flexibly provide Quality of Service to their customers with multiple different services. The policy mapping obtained using the present invention also gives the possibility to extend control decisions of Internet traffic to the user's preference (or user utility) where previously this could not be done without sacrificing flexibility and practicality.

Preferably, the comparing step further comprises comparing one or more predetermined application session characteristics with one or more predetermined policy characteristics according to one or more predetermined logical conditions contained in a user policy. The use of logical conditions allows for operations other than straightforward identity comparisons to be performed, thus further increasing the flexibility of the system.

In the preferred embodiment, the comparing step further comprises comparing one or more contemporary environmental conditions with one or more predetermined policy characteristics and/or predetermined application session characteristics according to one or more predetermined logical conditions contained in a user policy. This allows the system to use fuzzy logic in dependence upon environmental conditions such as time, network congestion, occurrence of certain events, or the like so that the most appropriate policy can be chosen not only because of the match to the applications session, but also taking into account the contemporaneous system environmental conditions prevalent at the time the mapping is to be made and/or the session is to take place.

Preferably each logical condition has a condition score allocated thereto, and the policy score comprises a sum of the condition scores for each logical condition found to be true. This allows some logical conditions to be rated more importantly than others, such that they contribute more to the policy score.

In the preferred embodiment, each condition score is adjustable by a user. This feature allows expert tuning of the score obtained from each logical condition so that the policy can be made to match precisely a user's requirements.

Moreover, preferably the application session characteristics are defined in accordance with any version of the Internet Engineering Task Force Session Description Protocol. This allows application descriptions to be compiled by different application vendors in accordance with agreed standards. Moreover, it allows policy compilation to be rendered easier, as the policy characteristics may simply match those relevant categories of the IETF Session Description Protocol. The use of IETF SDP (whichever version) ensures that policy compilers and session description compilers are essentially speaking the same language.

The selecting step may further comprise the further steps of expressing each policy score as a percentage of a respective predetermined policy pass-score, and selecting the policy with the greatest percentage as the policy for use. In an alternative embodiment, the selecting step may further comprise comparing the absolute policy scores, and selecting the policy with the greatest absolute score as the policy for use. However, in a yet further embodiment the selecting step may further comprise calculating a difference value for each policy score, being the difference between the policy score and a respective predetermined policy pass-score, and selecting the policy with the greatest positive difference as the policy for use. In other embodiments logical combinations of the three alternatives described above may be used, for example, a policy may be chosen if it has the greatest absolute score and the greatest percentage score. Which method is chosen as the selecting step is preferably left to user preference.

From a second aspect there is further provided an apparatus for selecting a user network usage policy for use with an application session, comprising:

a) storage means for storing data representing a plurality of user network usage policies;

b) comparison means arranged, for each policy of at least a subset of the stored policies, to compare one or more characteristics of the application session with one or more policy characteristics and to determine a policy score for each policy in the subset in dependence on the comparison; and c) selection means arranged to select a policy for use in dependence on the policy scores.

The second aspect further provides the corresponding features and associated advantages as described previously in respect of the first aspect.

In addition, from a third aspect the present invention also provides a computer program arranged such that when executed on a computer it causes the computer to perform a method according to the first aspect.

Furthermore, from a fourth aspect there is also provided a computer readable storage medium storing a computer program according to the third aspect. The computer readable storage medium may be any magnetic, optical, magneto-optical, solid-state, or other storage medium capable of being read by a computer.

BRIEF DESCRIPTION OF THE DRAWINGS

Further features and advantages of the present invention will become apparent from the following description of an embodiment thereof, presented by way of example only, and by reference to the accompanying drawings, wherein like reference numerals refer to like parts, and wherein.

DETAILED DESCRIPTION OF EXEMPLARY EMBODIMENTS

Embodiments of the present invention will now be described with reference to FIGS. 1 to 5.

Figure 1:
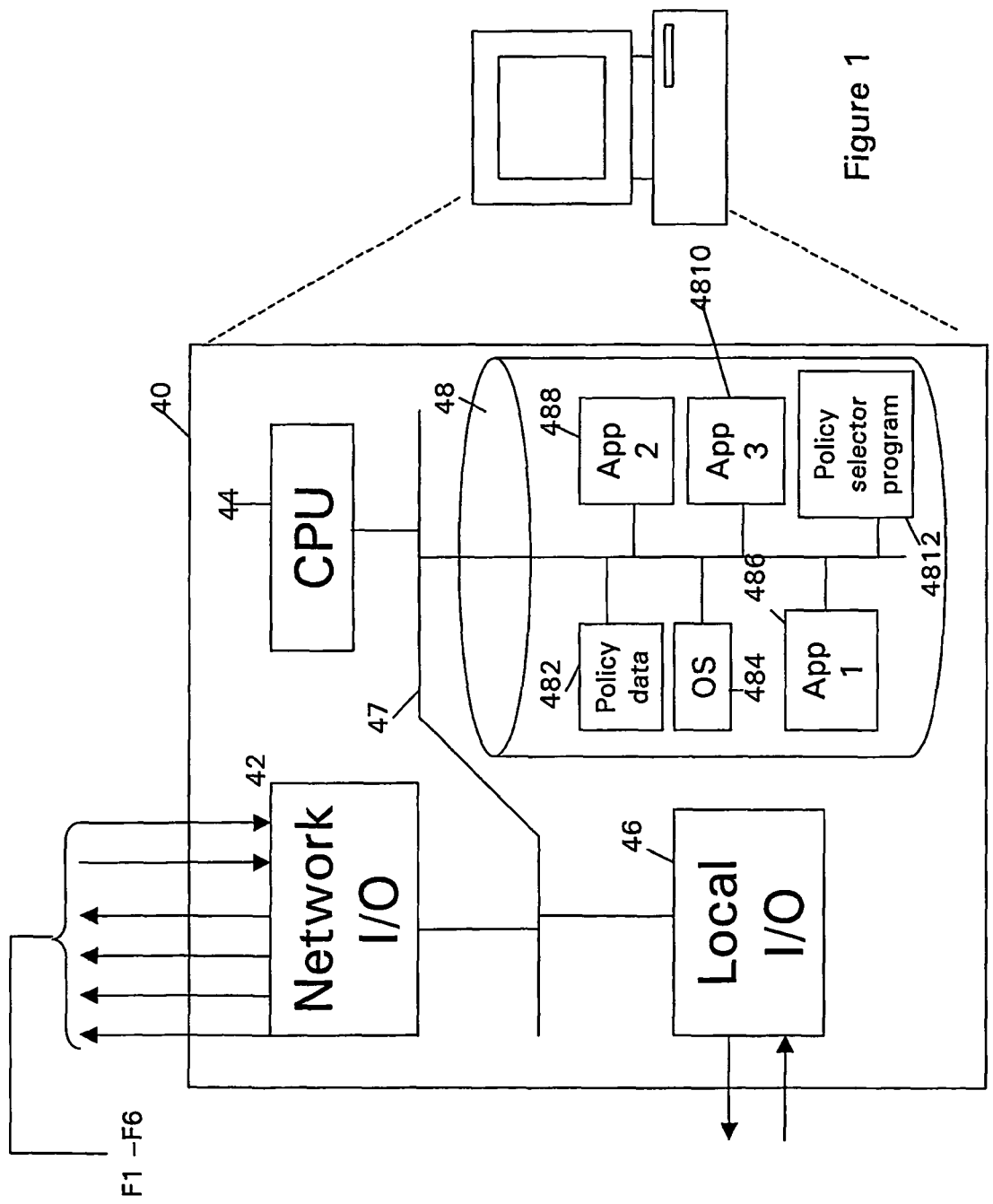
FIG. 1 is a block diagram of a computer system which forms the embodiment of the present invention.

FIG. 1 illustrates the operating environment of the present invention. More particularly, an embodiment of the present invention provides a policy selector software program 4812, which is stored on a computer-readable storage medium such as the hard disk 48 provided in a user computer 40. By way of example, the policy selector program 4812 may be part of a software application, part of a middleware, or a stand-alone program in its own right. Also stored on the hard disk 48 is an operating system program 484, program policy data files 482, and a number of executable application programs App1 486, App2 488 and App3 4810, each of which possess functionality to access or send data over a network. The computer is further provided with a central processing unit 44 capable of executing computer program instructions, a central data bus 47 to provide internal communications between the components, a network input and output card 42 to allow interconnection of the computer to a network, and local input and output interface means 46 to allow connection of user input and output devices such as monitors, keyboard, mouse, printer, or the like.

It should of course be noted and would be understood by the intended reader that the above description is for illustrative purposes in respect of the present invention only, and in reality many more systems, sub-systems and components would be required to provide a fully operational computer. Such additional elements are well known in the art, and should be taken as being implied herein.

In use the operation of the above described operating environment may be as follows, by way of example. Suppose the user of the computer starts up one or more of the three applications App1, App2, or App3 to give one or more respective application sessions for each. Each session involves setting up one or more data traffic flows F1 to F6 via the network interface 42, such that, for example, App1 might create outward flows F1, and F2. App2 might create outward flow F3 and receives inward flows F5 and F6. App 3 might create a single outward flow F4. The applications App1, App2, and App3 may be any type of software applications which create data traffic flows over a network, such as, by way of non-limiting example, file-sharing utilities such as Napster or Gnutella, FTP clients and servers, Internet browsers such as Netscape® or Microsoft® Explorer®, streaming multimedia applications such as those provided by RealNetworks Inc., 2601 Elliott Avenue, Suite 1000 Seattle, Wash. 98121, voice-over-IP applications, video-conferencing applications, etc. etc.

It should be noted that the data traffic flows may be almost any protocol, although within the embodiment either TCP or UDP over IP is preferred.

Although we have described above specific mappings of Flow-Ids to applications, in reality the Flow-ID's chosen by applications would be randomly generated, and hence the flow mappings would not be apparent. In order to address this problem it is necessary to use a flow-mapper system such as is described in our earlier co-pending European patent application no. 02251983.9., any details of which necessary for understanding the present invention being disclosed herein by reference. The present invention is, however, concerned with mapping application user network use policies to application sessions, and hence complements, rather than relies upon, our earlier invention.

Figure 3:
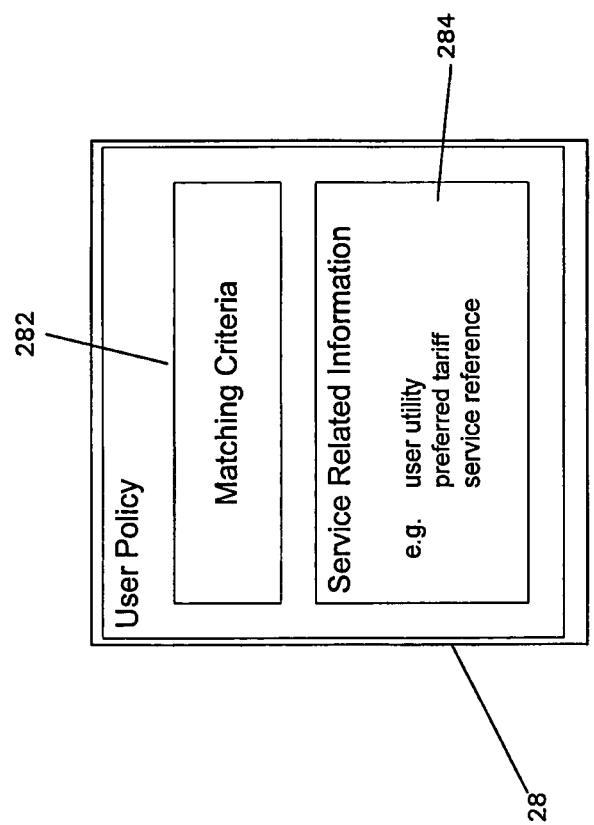
FIG. 3 is a graphical illustration showing the semantic data which is contained within a user policy used in the embodiment of the present invention.

When an application session is launched, the policy selector program 4812 is run to select a user network usage policy for the application session. The semantic structure of a user network usage policy is shown in FIG. 3 whence it will be seen that a policy contains service related information and matching criteria. Service related information contains important information that are related to the service provided by the service provider, information such as the user's preferred tariff (Users may not have a definite answer to what tariff they want to select, but they have a preference to what they want, for example, a cheap service or a high quality service), the user's utility for the service (a user preference of an application traffic profile) and the service reference (a unique identity of a service offered by a service provider e.g. service id 1000=premium service). The matching criteria are a list of constraints for the processing elements of the present invention to compare with a session description. It should be noted that in practice user policies may contain much additional information in addition to that mentioned above.

Within each user policy there is a section that describes the matching criteria. Each criterion has a score for each element. Content of the session description and environmental constraints are used to compare with a user policy, and a condition score is awarded to each criterion if matched, or else, no score will be awarded. Here is an example of a set of matching criteria:

Pass score = 590
Preferred policy name:                {matching criterion}
    If Name = BestQoS, then Score = 100 {element, award score}
    If Name = MaxQoS, then Score = 100
FlowID:
    If Source IP address = 10.0.1.10, then Score = 100
ApplicationInfo:
If Name = RealPlayer and Version = 8.0, then Score = 100
If Name = RealPlayer and Version = 7.0, then Score = 90
StreamType:

-continued

If Name = RealPlayer data stream, then Score = 100
EnvironmentalConstraints             {this   will   be address further later}
    If Network Status.AvailableBandwidth >= MaxRate, then Score = 100
    If System.time = tariff.offPeakHour, then Score = 100   {the user prefer this policy to be used in off-peak hours}

It will be seen from the above example matching criteria that characteristics of the policy are compared with characteristics of the application session according to predetermined logical conditions. Thus, for example, with respect to the Applicationinfo part of the policy, the Name and Version of the launched application (being characteristics thereof) are compared with "RealPlayer" and "7.0" or "8.0", being characteristics of the policy according to an "equals to" logical condition.

Note also that although not displayed so above for ease of understanding, preferably the user policy including the matching criteria and the associated logical conditions are written in XML.

In addition to specific user policies, It is also useful to define a "one-fits-all" policy as a default policy for the user, along with a set of policies that fits to particular application task, and some specific policies that are written for a particular service used by a particular application session. This example forms a structured scheme to help user in organising the policy files.

In order to allow for comparison of the session characteristics with those prescribed within the policy, each application session is provided with a session description which describes the application session and the network-related properties thereof which will result when the application session is created. An example session description is shown below.

```
<ApplicationInfo>
    <Name>RealPlayer</Name>
    <Version>8.0</Version>
</ApplicationInfo>
<DataStreamInfo StreamType="Realplayer data stream">
    <Control>
        <URL>rstp://10.0.1.10:554/mtv.rm</URL>
        <1-- Rate in bit/s -->
        <MinRate>56000</MinRate>
        <InitialRate>256000</InitialRate>
        <MaxRate>450000</MaxRate>
    </Control>
    <FlowDescription>
<Flow>
        <SourceIP>10.0.1.10</SourceIP>
        <SourcePort>*</SourcePort> {* means anything}
        <DestinationIP>10.0.1.2</DestinationIP>
        <DestinationPort>*</DestinationPort>
        <ProtocolID>TCP</ProtocolID>
    </Flow>
    <Flow>
        <SourceIP>10.0.1.10</SourceIP>
        <SourcePort>*</SourcePort>
        <DestinationIP>10.0.1.2</DestinationIP>
        <DestinationIPort>* </DestinationPort>
        <ProtocolID>UDP</ProtocolID>
    </Flow>
    </FlowDescription>
</DataStreamInfo>
<PreferPolicy>
    <Name>BestQoS</Natfle>
</PreferPolicy>
```

This session description describes a RealPlayer™ v8.0 video playback session, where video data is sent to the user machine (10.0.1.2) from the content server (10.0.1.10). The request URL (in the control tag) is rstp://10.0.1.10:554/mtv.rm with a minimum stream rate of 56 kbps and a maximum rate of 450 kbps, and an initial rate of 256 kbps. There are 2 streams of traffic (in flow description tag), one TCP stream and one UDP stream. The "PreferPolicy" field shows that a best quality Internet transport is preferred for this session to maintain a good quality video playback.

Note that although not shown so above for reasons of clarity and ease of understanding, preferably within the presently described embodiment the session description and user policies are structured with a common standard, for instance, or Internet Engineering Task Force (IETF) Session Description Protocol (SDP) or Internet Engineering Task Force (IETF) Session Description Protocol next generation (SD-Png). This ensures that the session and policy characteristics can be directly compared using essentially the same descriptive language as a finite namespace is defined for the session description. Hence, the evaluation engine which performs the comparison between session descriptions and matching criterion can locate and understand the keywords in the description. This produces a high coupling between the content of session descriptions and the user policies.

Preferably, the session description is obtained from session negotiation or generated by the operating systems, the application itself, the middleware or collected from the session directory.

Figure 4:
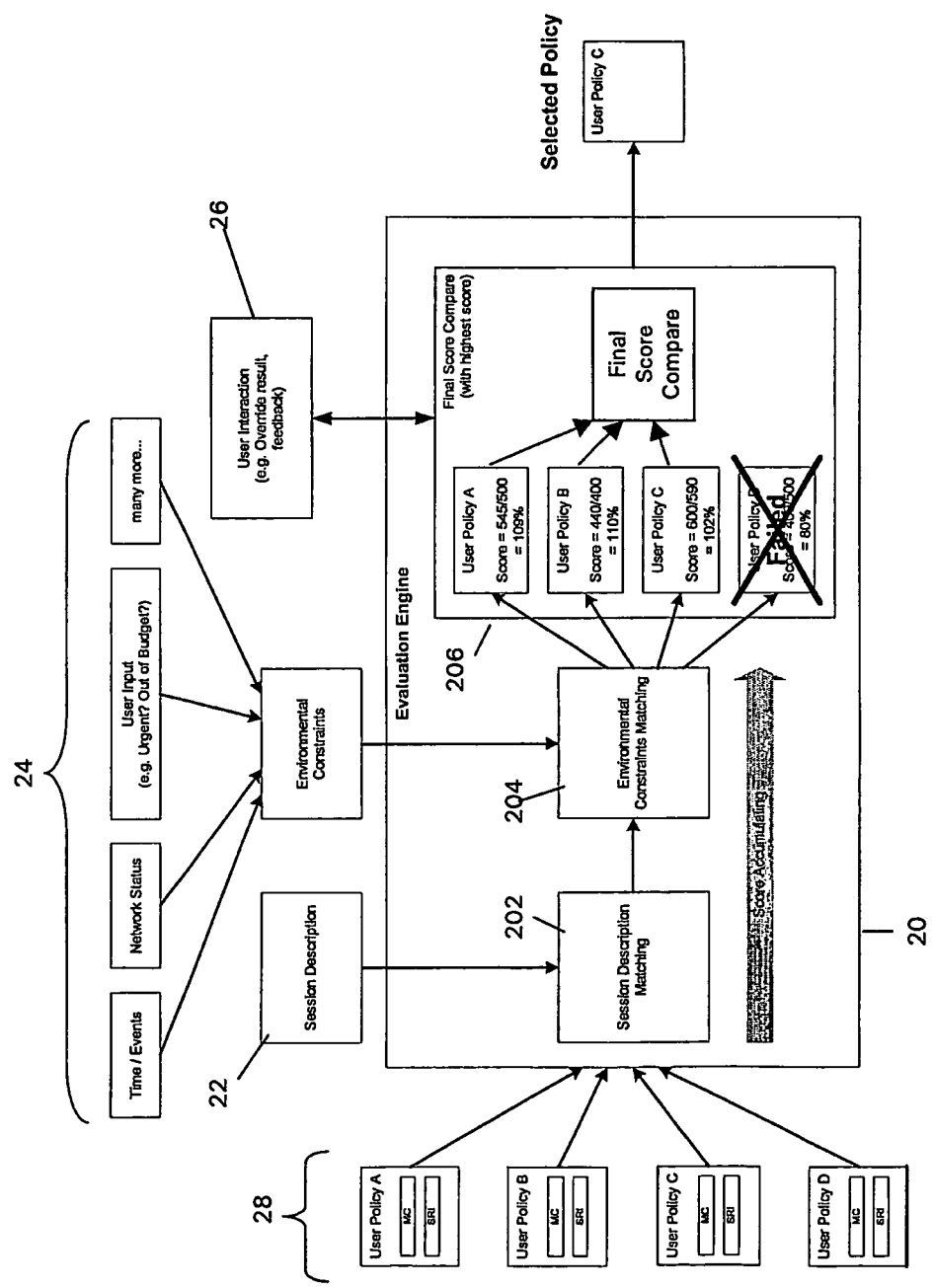
FIG. 4 is a system diagram illustrating how the features of FIGS. 2 and 3 are derived and interact.

Having described the structure of the user policies and the session description, a brief overview of the operation of the matching process will be described with respect to FIG. 2, followed by a detailed description of the whole policy selection process with respect to FIGS. 4 and 5.

Figure 2:
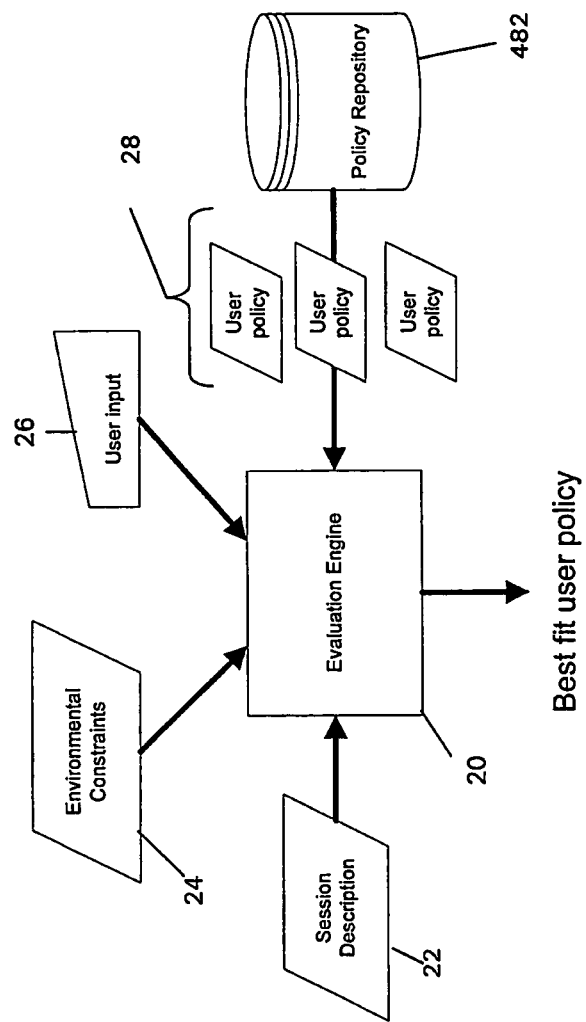
FIG. 2 is a block diagram of the functional elements required by the embodiment of the present invention.

Turning to FIG. 2, it will be seen that that core of the system provided by the embodiment of the invention is a processing module referred to in the Figure as the "Evaluation Engine" 20. The evaluation engine 20 acts to receive the following data: a session description 22 of an application session for which a policy is to be selected; some environmental constraints 24; any user direct input 26; and several user policies 28 (of which one will be selected) obtained from a policy repository 482. The evaluation engine then looks for the most appropriate user policy for a particular application session.

The Environmental constraints mentioned above are contemporary system or external characteristics that are present at the time the policy matching is to be made. Example constraints are, for example, user budget, system time, bandwidth price, network status, urgency of data to be transported by the network, importance of data, and recorded user behaviour. The environmental constraints are an important input to the Evaluation Engine and cover a wider area of logical decision making for the engine. By including such environmental constraints within the decision making logic, the system is not only able to compare the standard matching criteria to a session description but is also able to know when it is a better circumstance to use a certain policy in a certain scenario. For instance, there may be two "best QoS" user policies with different environmental constraints. Policy "BestQoSA" may state that this policy should be used only when the network can cope with the requirement and when the time slot is known as off-peak, whereas policy "BestQoSB" may be used when the time slot is known as on peak and the user is in an "urgent state". Thus, environmental constraints play a very important role in the decision making process. Without environmental constraint, the system can only determine which policy may suit the application task, but not what the user needs. In order to build this interaction, a user interface, event listeners and data adapters are provided, as are generally known in the art.

The user direct input considered by the evaluation engine could be for example user commands to specifically override the selection of a particular policy, of to specifically alter one or more of the logical condition scores contained within the policy so as to change the probability of a policy being selected. It is necessary to consider direct input from the user in the decision logic as the user may want to override the decision making process of the Evaluation Engine. This can be done by manually selecting a dedicated user policy or changing the score weighting of each matching criterion. The score weighting behaves like a multiplier for each criterion. For instance, a user may have a higher preference in policy which emphasis good quality, the system allows the user to put a higher weighting to the matching criteria of quality by giving them the ability to double or multiple folds. A user interface (which is preferably although not necessarily a graphical user interface) is provided by the system to facilitate the interaction. Provision of user interfaces in general which would be suitable for use with the present invention is well known in the art.

In use the Evaluation Engine 20 assists the user in selecting the most suitable policy for a particular session. It goes through the user policies 28 stored in the policy repository 482 and matches them with the provided session description 22 and environmental constraints 24. The Evaluation Engine is based on a scoring system. The score reflects a user value to each policy for different applications. An example of the application of the example policy matching criterion given earlier to the example session description given earlier will make the process clearer.

In order to evaluate the matching criterion against the session description, the Evaluation Engine 20 reads the content of the session description 22 and compares them with the user policy of interest 28. First the engine looks into the XML tag <Name> & <Version>. In the examples above the session description shows that this is a session for RealPlayer 8.0; the user policy states that if it is RealPlayer and the version is 8.0, a score of 100 will be awarded. Therefore, this policy will get 1 00 marks for the criterion "ApplicationInfo". However, the session description may be created for an older version such as RealPlayer 7.0, so 90 marks will be awarded instead.

Furthermore, the session description also contains a field with:

```
<ApplicationInfo>
    <Name >Real Player</Name>
    <Version>8.0</Version>
</ApplicationInfo>
```

From the user policy there is a field with:
ApplicationInfo:
If Name=RealPlayer and Version=8.0, then Score=100
If Name=RealPlayer and Version=7.0, then Score=90
and hence the first of the above logical conditions will be found to be true and a score of 100 generated. This score of 100 is added to any previous score which has been generated from earlier positive logical conditions, and a cumulative score kept. This matching procedure is repeated for each matching criterion within the policy i.e. the session description is parsed to see if there is an equivalent entry.

After going through each matching criterion, scores are added together from each criterion to form a final score. Then the final score is compared with a policy pass score, which is pre-determined and contained within each policy. If the final score of a policy is higher than the policy pass score, then the policy will be taken into account for the final comparison. Within the previous example the pass score for the policy is 590. However, from a consideration of the individual logical condition scores it is possible to score 600 which is a much more preferable score than the pass score.

Once each policy has been processed in accordance with the above a final comparison step is then performed within the preferred embodiment, which represents an additional layer of processing to consider the scores achieved by each policy. There are several ways to perform the final comparison, for instance, we may compare the final score regardless of the pass score; we may compare it with a percentage mark; or we may compare a difference between the policy pass score and the policy final score. If we assume that three policies A, B, and C have been matched and have achieved respective policy scores with respect to respective pass-cores as follows:—
  Policy A scores 545/500=109%
  Policy B scores 440/400=110%
  Policy C scores 600/590=102%
then by using a comparison of the respective percentages of the policy scores against the respective pass-scores (shown above), then it will be seen that policy B is the winner with 110%, and would be selected as the policy for use with the application session. In contrast, if an absolute policy-score is considered which does not take into account the respective policy pass-score, then policy C would be selected with a policy-score of 600. Finally, if the third method of final comparison is used wherein the respective differences between the policy scores and the respective pass-scores are found, policy A would be selected with the greatest positive difference of 45.

The above example shows that the method used in the final comparison seriously affects the result. However, it is preferably left for the user to decide which method suits them best, as it greatly depends upon how the scores are distributed among each element.

It may happen that the system is not able to identify the most appropriate user policy for an application session. For instance: there are two or more policies which have the highest score; there is no policy that passes the pass score; there is no policy defined for that particular application session. For these circumstances, the system should ask the user for a preference by displaying a user interface or revert to a default policy. Additionally, the user should be able to manually select a policy in the policy repository, change the weighting, or request the system to re-evaluate again. There are many ways that we can handle this situation, the example solutions above are only part of them.

A second example of the operation of the presently described embodiment will now be described with reference to FIGS. 4 and 5, which will make clearer the operation of the matching of environmental constraints with multiple policies. Here, assume that the time of day when the matching is being performed corresponds to an "off-peak" time as defined by the present network tariff, that the maximum available bandwidth on the network is 480 kbps, and that we have four user policies from which one is to be selected, the details of the policies being as follows:
Policy A
Pass score=500
Preferred Policy Name:
  If Name=BestQoS, then Score=200
  If Name=MaxQoS, then Score=200
ApplicationInfo:
  If Name=RealPlayer and Version=8.0, then Score=200
  If Name=RealPlayer and Version=7.0, then Score=190
EnvironmentalContraints:
  If Network Status.AvailableBandwidth >=MaxRate, then Score=100
  If System.time=tariff.on PeakHour, then Score=100, else Score =45
Policy B
Pass score=350
Preferred Policy Name:
  If Name=BestQoS, then Score=200
  If Name=MaxQoS, then Score=200
ApplicationInfo:
  If Name=Windows® Media Player and Version=7.0, then Score=200
  If Name=Windows® Media Player and Version=6.0, then Score=190
EnvironmentalContraints:
  If Network Status.AvailableBandwidth >=MinRate, then Score=100
  If System.time=tariff.offPeakHour, then Score=100, else Score=45
Policy C
  Pass score=590
  Preferred Policy Name:
    If Name=BestQoS, then Score=100
    If Name=MaxQoS, then Score=100
  FlowID:
    If Source IP address=10.0.1.10, then Score=100
  ApplicationInfo:
    If Name=RealPlayer and Version=8.0, then Score=100
    If Name=RealPlayer and Version=7.0, then Score=90
  StreamType:
    If Name=RealPlayer data stream, then Score=100
  EnvironmentalContraints:
    If Network Status.AvailableBandwidth >=MaxRate, then Score=100
    If System.time=tariff.offPeakHour, then Score=100
Policy D
Pass score=590
Preferred Policy Name:
  If Name=MaxQoS, then Score=100
FlowID:
  If Source IP address=10.0.1.10, then Score=100
ApplicationInfo:
  If Name=RealPlayer and Version=8.0, then Score=100
  If Name=RealPlayer and Version=7.0, then Score=90
StreamType:
  If Name=RealPlayer data stream, then Score=100
EnvironmentalContraints:
  If Network Status.AvailableBandwidth >=InitialRate, then Score =100
  If System.time=tariff.offPeakHour, then Score=100

Assume that the launched application session for which one of the four policies A, B, C, or D corresponds to the RealPlayer session described in the example session description given previously.

Figure 5:
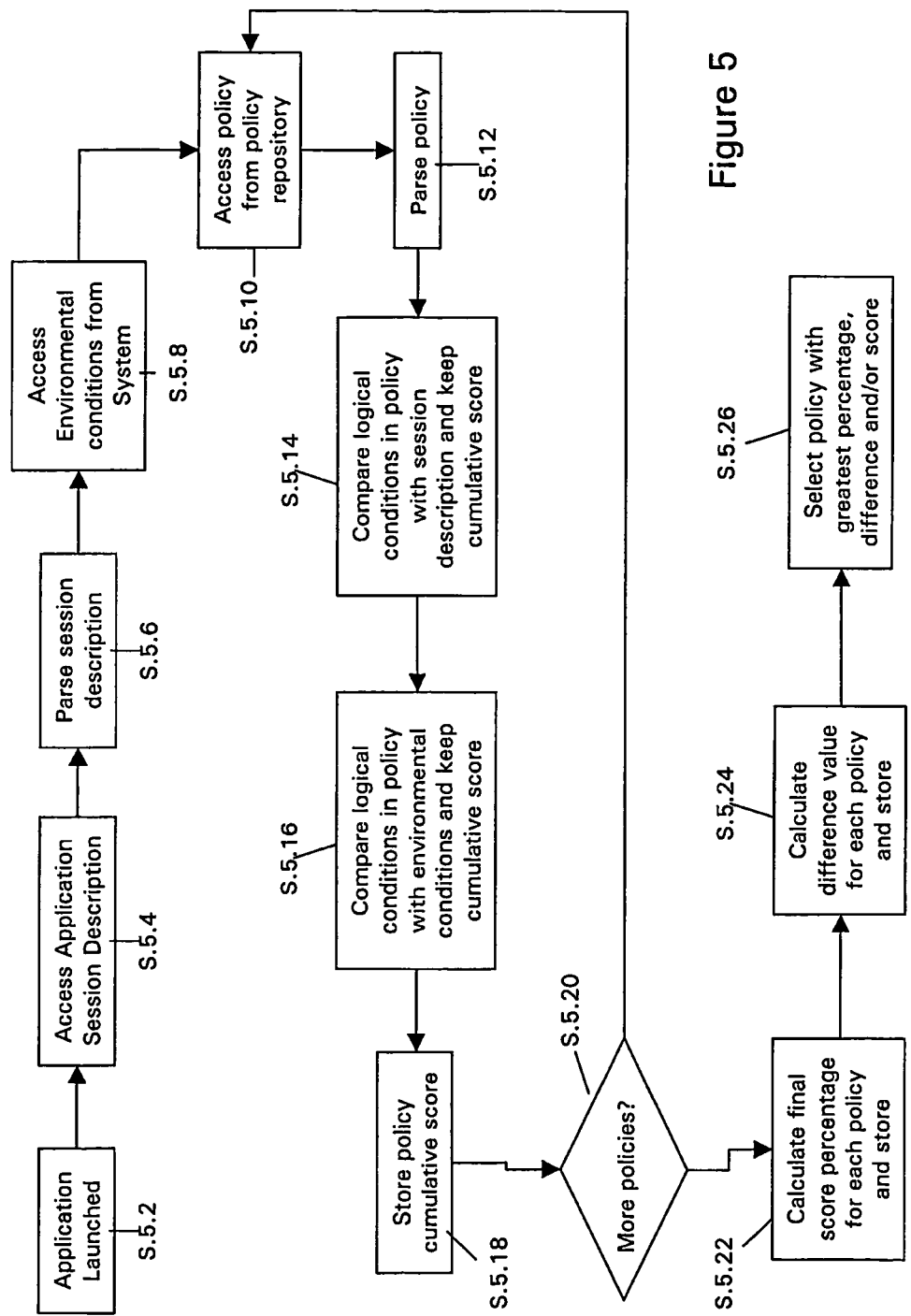
FIG. 5 is a flow diagram illustrating the operation of the policy selector program of FIG. 1.

FIG. 5 is a flow diagram showing the process flow undertaken by the policy selector program 4812 in order to select a user policy for an application session. Firstly, at step 5.2 the application is launched. In this case the launched application is RealPlayer version 8, and hence a RealPlayer session is established. The launching of the application is detected by an appropriate event detector, which is arranged to activate the policy selector program 4812 upon application launch. Preferably the event detector is part of a middleware that takes care of the application session initiation, and produces a session description before the application session is begun.

Once the policy selector program 4812 has been activated, at step 5.4 it operates to access the RealPlayer application session description from the application directory. The application session description is preferably written in IETF SDP, or SDPng, but for the purposes of this example corresponds to the session description given previously on page 9.

Having accessed the application session description, at step 5.6 the policy selector program 4812 parses the session description, and stores the characteristics thereof in memory. Next, at step 5.8 the various contemporary environmental conditions of the system are accessed, such as, for example, the system time, and the network bandwidth availability. In this example we assume that the system time corresponds to an "off peak" time and that the maximum available bandwidth on the network at the present time is 480 kbps. The accessed environmental conditions are also stored in memory for later use in the comparison steps.

Having obtained the above mentioned information, the policy selector program 4812 is now ready to compare the obtained information with the matching criteria contained in each available user policy. Therefore, at step 5.10 the program accesses the first policy, being in this case policy A, from the policy repository 482. Then, at step 5.12 the policy is parsed to determine the matching criteria contained therein, and the discovered matching criteria stored for use in the matching process. The program is then ready to perform a comparison of the matching criteria of policy A with the characteristics of the session description.

Therefore, at step 5.14 the characteristics of the session description are compared with the logical conditions in the policy. With respect to policy A as given previously (please refer here to the session description on page 9, and Policy A given earlier), the first characteristic to be tested is the preferred policy name. Here, the application session description specifies that the preferred policy name should be "best QOS" and according to the logical conditions contained in the matching criterion, if the preferred policy name equals "best QOS" then a score of 200 is obtained.

The next characteristic in the policy is that of the application_info, and in this respect the session description specifies the application_info as being of name real player and of version 8.0. With respect to the matching criteria in the policy, it will be seen that if the application_info name equals real player and the version equals 8.0, then a score of 200 is obtained. Thus so far a cumulative total of 400 has been obtained for policy A.

Next, the environmental constraints specified in the policy are tested. Recall that the available bandwidth of the network was determined at step 5.8 to be 480 kbps, and that the session description specifies a max rate of 450 kbps. Therefore, according to the first logical condition in the environmental constraints part of the policy A, provided the available network bandwidth is greater than or equal to max rate specified in the session description, then a score of 100 is obtained. This criteria is met in the present case, and hence a cumulative total of 500 is obtained.

Next, the system time is compared. The policy specifies that if the system at the time the matching is being performed corresponds to a peak hour as defined by the network tariff then a score of 100 is obtained, and in other cases a score of 45 is obtained. Recall that at step 5.8 it was determined that the system time corresponded to an off peak time, and hence the score of 45 is obtained to give a cumulative total of 545. As the pass score of policy A is specified as being 500, the cumulative total of 545 exceeds this pass score, and hence policy A will be considered as a candidate for selection in the final comparison stage. Therefore, at step 5.18 the policy cumulative score of 545 is stored in memory for later use.

Next, having processed the first policy (policy A), a comparison is made by the policy selector program 4812 at step 5.20 to see if there are any further policies which require processing. In this case the answer is yes, and hence the processing flow returns to step 5.10 wherein the next policy, policy B, is accessed from the policy repository 482.

The identical procedure as previously described in respect of policy A is then carried out in respect of policy B. To wit, at step 5.12 the policy is parsed to determine the matching criterion, and at step 5.14 the conditions of the matching criterion are compared with those of the session description. Following that at step 5.16 the conditions of the matching criterion are compared with the environmental conditions determined at step 5.8. The cumulative score obtained by the conditions is then stored at step 5.18.

With respect to policy B (please refer here to the session description on page 9, and Policy B given earlier), the first criterion to be measured is again that of the preferred policy name. Here, as the session description specifies a preferred policy name of "best QOS" a score of 200 is obtained. Next, the application_info criteria are tested, but here, as the application_info given in the session description does not correspond to the characteristics of the policy then no score is obtained.

Finally, the environmental constraints are tested. Recall that the network available bandwidth is 480 kbps but that the matching criterion in the policy specified in the bandwidth must be more than the session min rate to obtain a score of 100. Since the session description specifies min rate as 56 kbps, a score of 100 is obtained, to give a cumulative score of 300. Next, the system time criteria is measured, and here the policy specifies that if the time corresponds to an off-peak time as defined by the present tariff then a score of 100 is obtained, else a score of 45 is obtained. In this case it will be recalled that it was determined at step 5.8 that the time corresponded to an off-peak time as defined by the present tariff, and hence a score of 100 is achieved, to give an overall cumulative total policy score for policy B of 400. In view of the policy pass score of 350, it will be seen that policy B can also be considered in the final comparison step.

Following the performance of step 5.18 in respect of policy B, a comparison of step 5.20 is again undertaken, an in this case processing returns to step 5.10 wherein policy C is accessed from the policy repository. Then the steps 5.12, 5.14, 5.16, and 5.18 are performed as described previously, but this time in respect of policy C.

With respect to policy C, it will be seen (please refer to the session description on page 9, and Policy C given earlier) that a score of 100 is obtained due to the policy names matching and a further score of 100 due to the matching source addresses. An additional score of 100 is obtained due to the matching application info and a further 100 (to give a cumulative score of 400) for the matching stream type given in the policy with that as given in the session description. When the environmental constraints are tested, it will be seen that the network available bandwidth of 480 kbps is greater than the session max rate of 450 kbps, and hence a further 100 is a obtained, and furthermore since the time corresponds to an off peak time as defined by the presently in force tariff an additional score of another 100 is obtained. Therefore, the cumulative policy score for policy C is 600, which is greater than the policy pass score of 590. Thus the policy C will also be considered in the final comparison.

After considering policy C, the evaluation at step 5.20 returns that there is one further policy still to process, and hence process flow returns to step 5.10 wherein policy D is accessed from the policy repository 482. Policy D is then processed in accordance with steps 5.12, 5.14, 5.16, and 5.18 in the same manner as previously described.

With respect to the score obtained by policy D, (please refer here to the session description on page 9, and Policy D given earlier) it will be seen that the preferred policy name does not match that given in the description, and hence no score is obtained there. However the flow_ID criteria is met, as is the application_info criteria. In addition, the stream_type criteria is met and both of the environmental constraints. However, the above logical conditions which are met only give a cumulative score of 500, whereas the pass score for the policy is 590. Therefore, as the policy score achieved by policy D when compared against the session does not meet the pass score for the policy, policy D is deemed to have failed and is not put forward for further consideration by the final comparison.

Once all of the policies have been considered, those candidate policies which met their pass scores are then considered in the final comparison. As will be recalled from the previous discussion, the final comparison can be determined in a number of ways. Firstly it is possible to merely compare the respective policy scores achieved by each policy, and select as the policy for use that one which achieved the absolute greatest policy score. Note that it is not necessary to perform further processing to obtain the absolute scores, as these have each already been stored in memory at step 5.18.

A second method of performing the final selection is instead to calculate the percentage of the policy score for each policy with respect to its own respective pass score, and this is performed at step 5.22.

A third method of performing the final comparison is to calculate a difference value for each policy representing the difference between the policy score which is achieved when compared with the session description with respect to its respective pass score. Therefore, at step 5.25 this "difference value" is calculated for each policy and stored.

Following the calculation of these various values, at step 5.26 the appropriate policy is selected depending upon which of the various policy matching criteria the user has selected to be used. In the present example, if the first method of simply comparing the absolute policy scores is used then policy C will be selected from the candidate policies A, B, and C, as policy C has the highest absolute pass score of 600. In contrast, if the second method of selecting the policy with the greatest percentage of its policy score with respect to its pass score is used, then policy B will be selected with a percentage of 114%.

If the third matching criteria of comparing the differences between respective pass scores and policy scores is used, then again here policy B will be selected with a difference of 50, in comparison with the differences of 45 for policy A, and 10 for policy C.

Thus, the precise selecting step used by step 5.26 is dependent on user preference setting. In the preferred embodiment, the inventors have found the second method of comparing percentage values to possess an advantage, as it effectively normalises out the potential differences in absolute scores when policies which have widely different numbers of logical conditions (and hence in theory could give very high or very low absolute scores) are tested against each other.

In the embodiment described above, at step 5.8 the present environmental conditions (such as time and available network bandwidth) are accessed from the system as a prelude to any of the user policies being accessed and processed in accordance with steps 5.10, 5.12, 5.14, 5.16, 5.18, and 5.20. In another embodiment, however, the step 5.8 of accessing the present environmental conditions can be performed separately for each policy, such that the step 5.8 is performed within the loop formed by steps 5.10, 5.12, 5.14, 5.16, 5.18, and 5.20. More particularly, the step 5.8 is performed after the step 5.12 where the presently processed policy is parsed, but before the step 5.16 where the environmental conditions are compared with the policy logical conditions, and therefore either immediately preceding or following step 5.14. By parsing the policy prior to the performance of step 5.8, it is possible to obtain knowledge of which environmental conditions are required for comparison by the policy, and hence only those conditions which are required as input to one or more of the policy's logical conditions as determined by the parsing step 5.12 are accessed from the system at step 5.8. With this exception of these differences, however, the alternative embodiment operates in exactly the same manner as the main embodiment described previously.

With respect to the performance of the embodiments, in the worst scenario where there are many user policies stored in the policy repository it is going to take the system a longer time to evaluate all the policies. In addition, managing those policies would be tedious. If policies are grouped together in a structure and stored in a Database, this will improve the performance of the search and this will make it easier to manage and organise policies.

Preferably service providers should provide a collection of default policies for the services they provide to their customers. Otherwise the system will have no idea which policy to use, or it will make it very difficult for a novice user to find out which policy suits him/her.

Moreover the system should be able to respond to the Environmental Constraints stated in the user policies. For instance, if the policy contains a statement that asks for the usage cost, the system should be able to respond with a measurement system to measure usage cost. Alternatively, the user should not be able to add constraints that the system is not able to react to.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A machine-implemented method of selecting user network usage policies for use respectively with each of a plurality of application sessions, the application sessions, each being provided with a session description identifying a network application to which the application session relates, said method comprising using at least one programmed computer to effect:
  a) storing a plurality of user network usage policies and performing the following in respect of each of said application sessions:
  b) for each policy of at least a subset of the stored policies, comparing, with reference to the session description of the application session and in dependence on the network application identified by that session description, one or more characteristics of the application session with one or more policy characteristics to determine a policy score for each policy in the subset; and
  c) selecting a network usage policy for use in dependence on the policy scores.

2. A method according to claim 1, wherein the comparing step further comprises:

comparing one or more predetermined application session characteristics with one or more predetermined policy characteristics according to one or more predetermined logical conditions contained in a user policy.

3. A method according to claim 2, wherein:
each logical condition has a condition score allocated thereto, said policy score comprising a sum of the condition scores for each logical condition found to be true.

4. A method according to claim 3, wherein each condition score is adjustable by a user.

5. A method according to claim 1, wherein the comparing step further comprises:
comparing one or more contemporary environmental conditions with at least one of (a) one or more predetermined policy characteristics or (b) predetermined application session characteristics, according to one or more predetermined logical conditions contained in a user policy.

6. A method according to claim 1, wherein:
the application session characteristics are defined in accordance with a version of the Internet Engineering Task Force Session Description Protocol.

7. A method according to claim 1, wherein the selecting step further comprises:
expressing each policy score as a percentage of a respective predetermined policy pass-score, and
selecting the policy with the greatest percentage as the policy for use.

8. A method according to claim 1, wherein the selecting step further comprises:
comparing the absolute policy scores, and
selecting the policy with the greatest absolute score as the policy for use.

9. A method according to claim 1, wherein the selecting step further comprises:
calculating a difference value for each policy score, being the difference between the policy score and a respective predetermined policy pass-score, and
selecting the policy with the greatest positive difference as the policy for use.

10. A computer-readable storage medium containing a computer program arranged such that when executed on a computer it causes the computer to perform a method according to claim 1.

11. An apparatus for selecting user network usage policies for use with each of a plurality of application sessions, the application sessions, each being provided with a session description identifying a network application to which the application session relates, said apparatus comprising:
a) storage means for storing data representing a plurality of user network usage policies;
b) comparison means arranged, for each policy of at least a subset of the stored policies, to compare, with reference to the session description of the application session and in dependence on the network application identified by that session description, one or more characteristics of each of said application sessions with one or more policy characteristics and to determine a policy score for each policy in the subset in dependence on the comparison; and
c) selection means arranged to select a network usage policy for use in each of said application sessions in dependence on the respectively corresponding policy scores.

12. An apparatus according to claim 11, wherein:
the comparing means is further arranged to compare one or more predetermined application session characteristics of each of said application sessions with one or more predetermined policy characteristics according to one or more predetermined logical conditions contained in a user policy.

13. An apparatus according to claim 12, wherein:
each logical condition has a condition score allocated thereto, said policy score comprising a sum of the condition scores for each logical condition found to be true.

14. An apparatus according to claim 13, further comprising:
user input means to allow each condition score to be adjusted by a user.

15. An apparatus according to claim 11, wherein the comparing means further comprises:
environmental comparing means for comparing one or more contemporary environmental conditions with one or more (a) predetermined policy characteristics and (b) predetermined application session characteristics of each of said application sessions according to one or more predetermined logical conditions contained in a user policy.

16. An apparatus according to claim 11, wherein:
the application session characteristics are defined in accordance with a version of the Internet Engineering Task Force Session Description Protocol.

17. An apparatus according to claim 11, wherein the selecting means further comprises:
percentage calculation means for expressing each policy score as a percentage of a respective predetermined policy pass-score, and
percentage selecting means for selecting the policy with the greatest percentage as the policy for use.

18. An apparatus according to claim 11, wherein the selecting means further comprises:
score comparison means for comparing the absolute policy scores, and
score selecting means for selecting the policy with the greatest absolute score as the policy for use.

19. An apparatus according to claim 11, wherein the selecting means further comprises:
difference calculating means for calculating a difference value for each policy score, being the difference between the policy score and a respective predetermined policy pass-score, and
difference selecting means for selecting the policy with the greatest positive difference as the policy for use.

* * * * *